May 24, 1949.  J. D. CAVANESS  2,471,367
LAWN MOWER
Filed Oct. 1, 1945  2 Sheets-Sheet 1
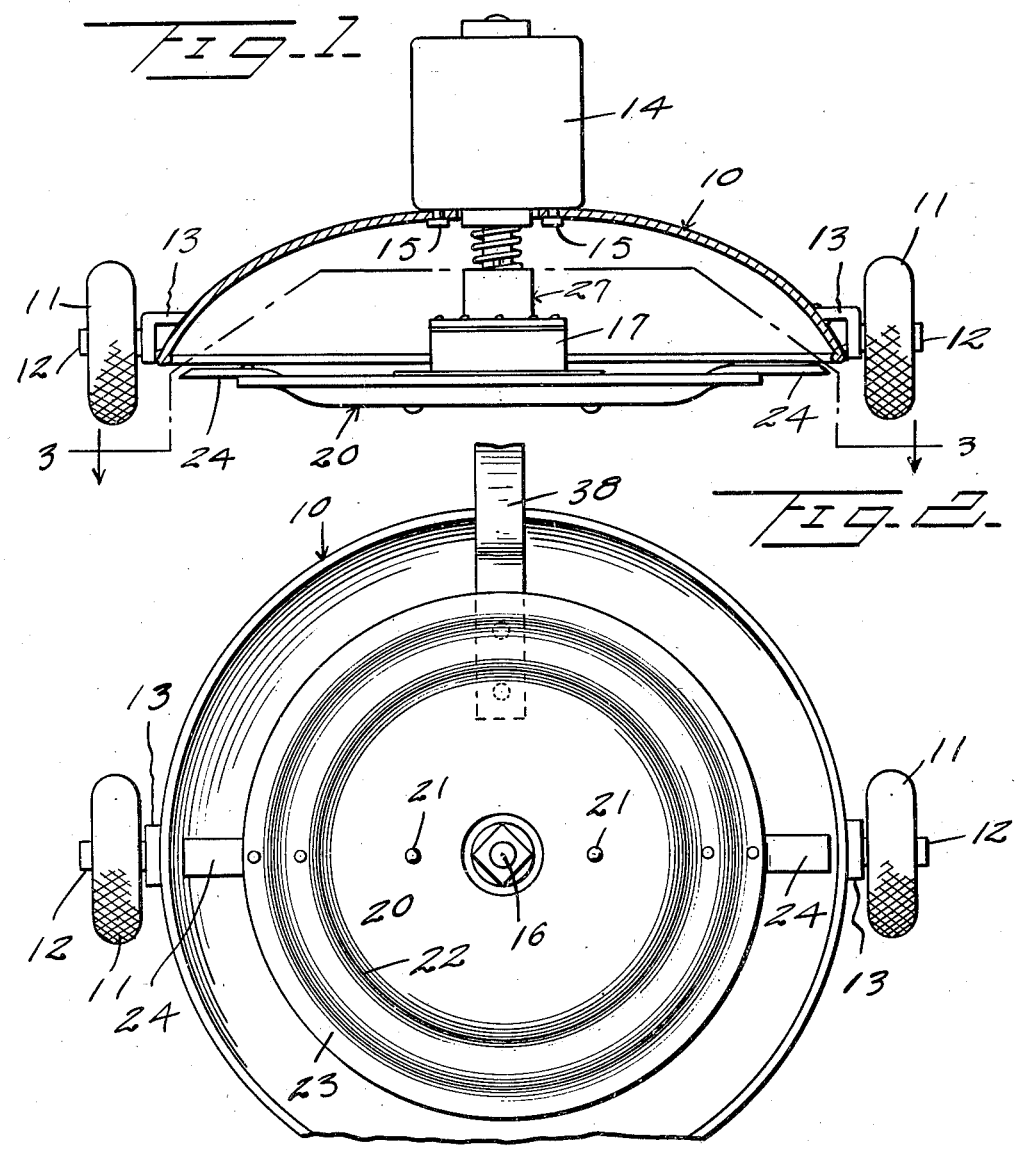

May 24, 1949.　　　　J. D. CAVANESS　　　　2,471,367
LAWN MOWER
Filed Oct. 1, 1945　　　　　　　　　　2 Sheets-Sheet 2
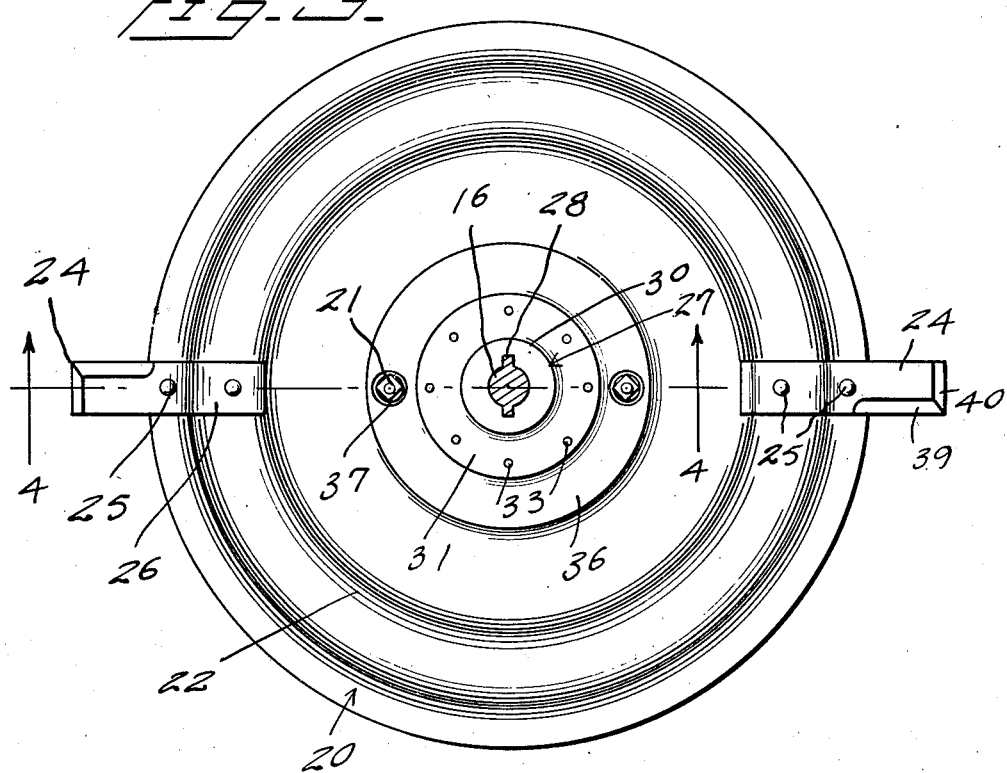
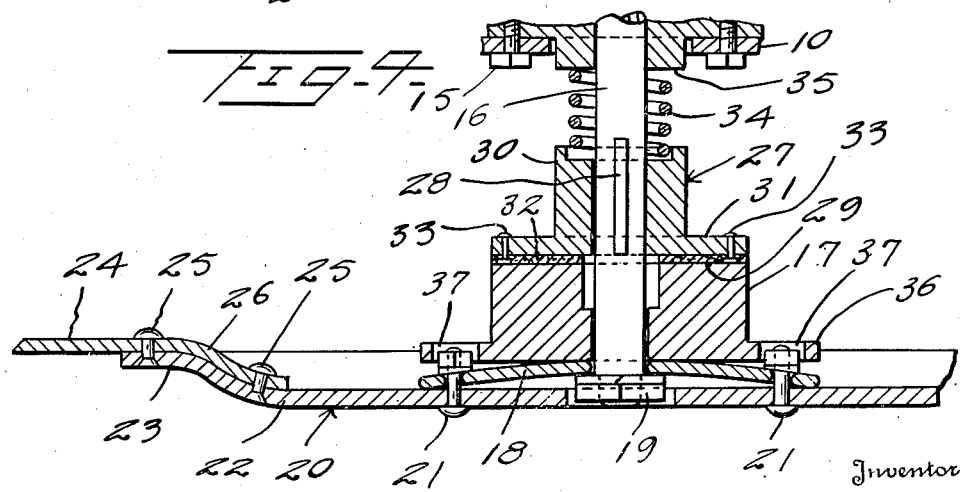
Inventor
James D. Cavaness
By
Kimmel & Crowell   Attorneys Patented May 24, 1949

2,471,367

UNITED STATES PATENT OFFICE 2,471,367

LAWN MOWER

James D. Cavaness, Arlington, Tex.

Application October 1, 1945, Serial No. 619,460

2 Claims. (Cl. 56—25.4)

This invention relates to lawn-mowers.

An object of this invention is to provide an electrically operated lawn mower having a horizontally rotatable cutting blade.

Another object of this invention is to provide a mower of the kind which includes a slip coupling between the power member and the cutting blade so that in the event obstructions are encountered the blade may slip relatively to the shaft.

A further object of this invention is to provide a mower of this kind including an electric motor mounted on a transversely arcuate shield, the motor having a vertical drive shaft extending downwardly into the concave side of the shield and the drive shaft having a rotatable cutting blade clutched thereon for rotation in a horizonal plane.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 1 is a vertical section partly in detail of a mower constructed according to an embodiment of this invention, Figure 2 is a bottom plan view of the device, Figure 3 is a sectional view taken substantially on the line 3—3 of Figure 1, Figure 4 is a fragmentary sectional view taken on the line 4—4 of Figure 3, and Figure 5 is a fragmentary plan view of the coupling plate between the lower clutch member and the blade structure.

Referring to the drawings, the numeral 10 designates generally a dome-shaped shield or frame member which is disposed with the concave side thereof facing downwardly. A pair of wheels 11 are rotatably mounted on shafts 12 which are carried by bracket members 13 secured to diametrically opposite points on the shield or frame member 10.

A motor 14 is disposed on the upper side of the shield or frame member 10 and secured thereon by fastening members 15. The motor 14 includes a vertically disposed drive shaft 16 extending downwardly through the shield or frame member 10. A lower clutch member 17 is loosely mounted on the lower portion of the shaft 16 and a dished resilient plate 18 is secured to the lower end of the shaft 16 below the clutch member 17 by fastening means 19 which is secured to the lower end of the shaft 16.

A cutting blade structure generally designated as 20 is bolted or otherwise secured to the plate 18 by fastening members 21. The fastening members 21 extend through the outer portion of the plate 18 as shown more clearly in Figure 4. There may be as many fastening members 21 as may be desired.

The blade structure 20 includes a supporting plate 22 which is formed with an upwardly offset outer portion 23. A pair of cutters 24 extend from the outer marginal edge portion of the offset 23 and are secured to the offset portion 23 by fastening members 25. The inner portion of each cutter blade 24 is downwardly bent as indicated at 26 so as to snugly engage the upper side of the offset portion 23.

An upper clutch member generally designated as 27 is splined on the shaft 16 as indicated at 28 and confronts the upper clutching face 29 of the lower clutch member 17. The upper clutch member 27 includes a hub 30 engaging about the shaft 16, which is formed at its lower end with a clutch plate 31 having a fibrous friction member 32 secured to the lower side thereof by fastening members 33.

The upper clutch member 27 is constantly urged downwardly to clutching engagement with the lower clutch member 17 by means of a spring 34 which is interposed between the hub 30 and a boss 35 formed as part of the motor 14. In order to provide a means whereby the blade structure 20 may have relative rotating movement with respect to the shaft 16, the lower clutch member 17 is formed with a lower flange 36 having openings 37 within which the upper ends of the fastening members 21 loosely engage. In this manner the fastening members 21 provide a loose coupling between the lower clutch member 17 and the blade structure 20 so that the latter may rotate or tilt as it is being rotated.

A handle 38 is secured to the frame or shield 10 and is of desired length so that the device may be moved over the grass during the cutting operation. Blade 24, as shown in Figure 3, is provided with a forward cutting edge 39 and with an outer cutting edge 40.

In the use and operation of this device, the motor 14 is connected by suitable conductors to a source of electric current supply. The device is moved over the grass and as the blade structure 20 rotates at the same speed as the motor shaft 16 the cutters 24 will cut the grass. As the blade structure 20 is loosely coupled to the lower clutch member 17 and the shaft 16, in the event the lower side of the plate 22 strikes the ground or an obstruction, the blade structure may tilt as it is rotated without injury to the shaft 16.

In the event the obstruction causes it to drag on the blade structure 20, the clutch member 27 may slip relative to the upper clutch member 17. Normally the two clutch members, 17 and 27, are clutched together and rotate as a unit under the compression or tension of the expansible spring 34.

What I claim is:

1. In a power lawn mower having a source of power, a shaft rotatable by said source of power, and a rotatable cutting member; coupling means for yieldably and rockably mounting said cutting member on said shaft for rotation therewith at substantially right angles to the axis thereof, said coupling means comprising fastening means forming a shoulder on the end of said shaft, a first element slidably carried by said shaft, a second element fixed to said cutting member and loosely engaging said shaft between said first element and said fastening means, one of said elements being formed with a flat surface and the adjacent surface of the other of said elements being convex, means fixed on said second element engaging said first element for rotation therewith, and a clutch member rotatable with said shaft and adapted to frictionally engage said first element.

2. In a power lawn mower having a rotatable shaft and a rotatable cutting member; coupling means for yieldably and rockably mounting said cutting member on said shaft for rotation therewith, at substantially right angles to the axis thereof, said coupling means comprising fastening means on the end of said shaft, a lower clutch member slidably carried by said shaft and formed with a flat lower surface, a concavo-convex plate fixedly mounted on said cutting member with the convex surface thereof facing outwardly, and formed with a central opening loosely engaging said shaft between said lower clutch member and said fastening means with said convex surface abutting said flat lower surface, means on said concavo-convex plate engaging said lower clutch member for rotation therewith, and an upper clutch member rotatable with said shaft and adapted to frictionally engage and lower said clutch member.

JAMES D. CAVANESS.

REFERENCES CITED

The following references are of record in the file of this patent:

UNITED STATES PATENTS

| Number | Name | Date |
|---|---|---|
| 762,975 | Anthony | June 21, 1904 |
| 1,503,446 | Hedglon | July 29, 1924 |
| 2,076,056 | Woodford | Apr. 6, 1937 |
| 2,302,472 | Power | Nov. 17, 1942 |
| 2,329,185 | Coddington | Sept. 14, 1943 |
| 2,335,574 | Thompson et al. | Nov. 30, 1943 |